Jan. 3, 1967　　　J. W. WOOLSEY ET AL　　　3,296,411
WELDING JIG

Filed May 18, 1966　　　　　　　　　　3 Sheets-Sheet 1

INVENTOR.
JOSEPH W. WOOLSEY
BY HOWARD I. BOWERS

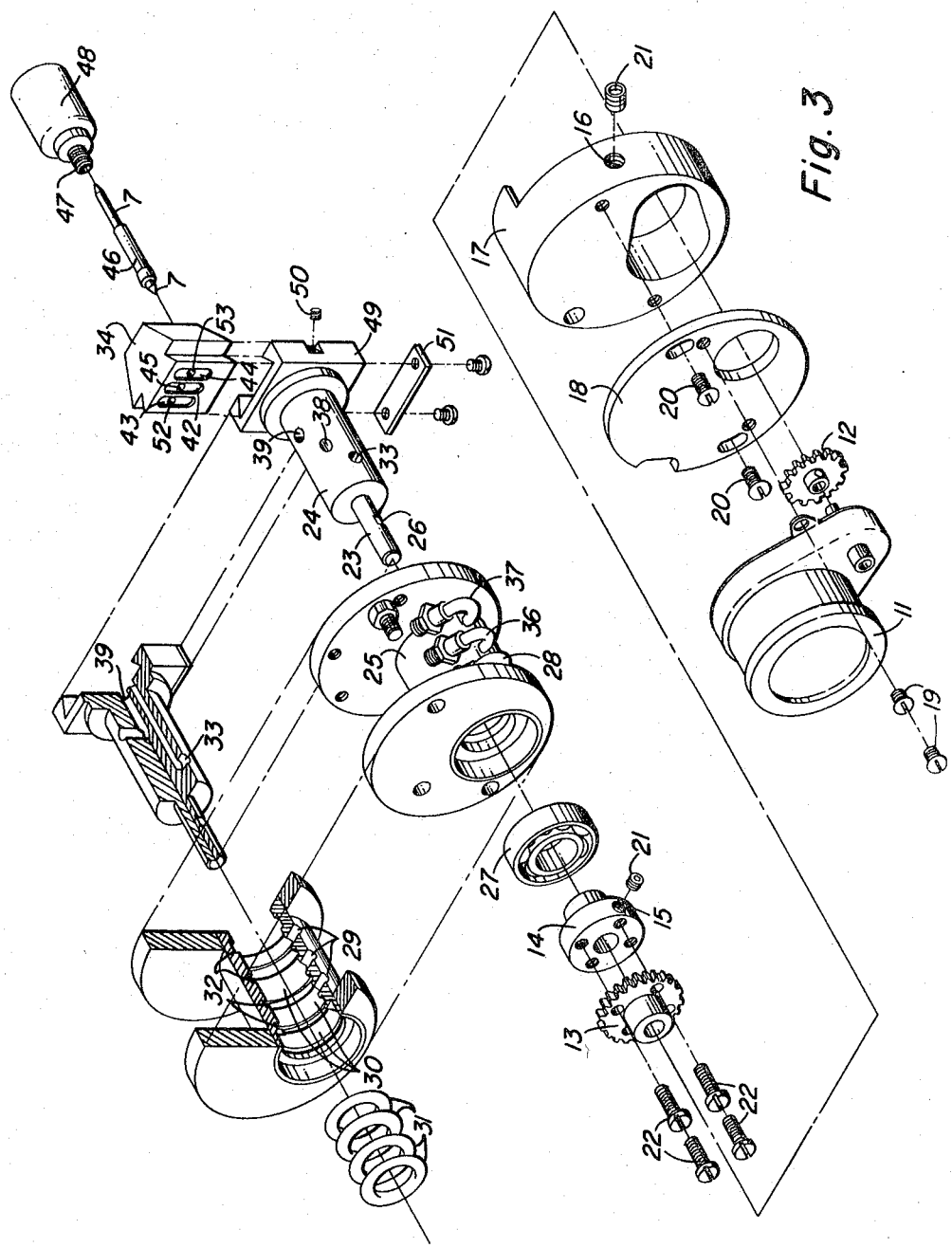

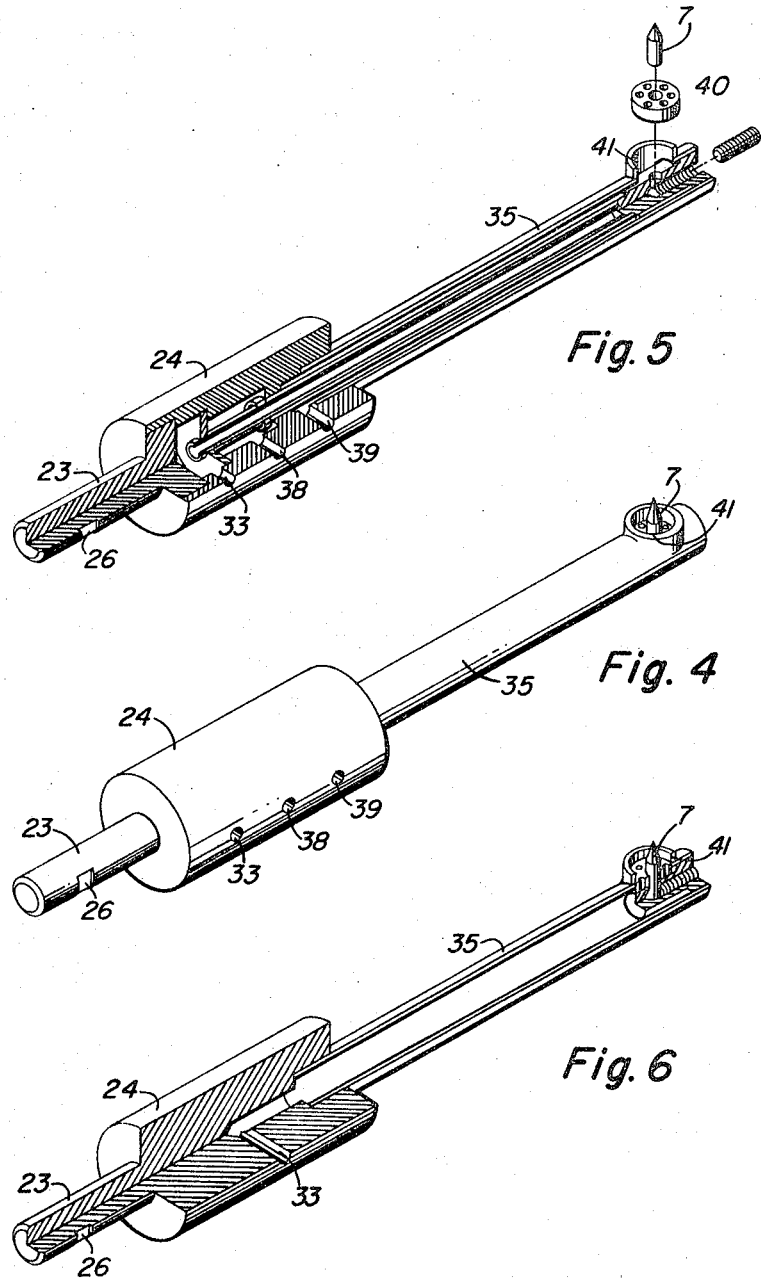

United States Patent Office 3,296,411
Patented Jan. 3, 1967

3,296,411
WELDING JIG
Joseph W. Woolsey and Howard I. Bowers, Los Alamos, N. Mex., assignors to the United States of America as represented by the United States Atomic Energy Commission
Filed May 18, 1966, Ser. No. 551,857
3 Claims. (Cl. 219—125)

The invention described herein was made in the course of, or under, a contract with the U.S. Atomic Energy Commission.

The present application is a continuation-in-part of application Serial Number 298,809, now abandoned, filed by the present inventors on July 30, 1963.

The present invention relates to a rotatable arc welding tool and, more particularly, to an automatically rotatable arc welding tool capable of internal and external welding operations.

An object of this invention is to provide a welding gun of simple construction which is easily adaptable to making either internal or external welds of varying diameters.

The nature of the improvements in welding tool construction of the present invention may be stated in general terms as preferably including jig means, said jig means including a plurality of adjustable legs for supporting an electrode in proper position for a welding operation, motor and transmission means rotating a shaft, a jacket around said shaft containing a duct, and an electrode and electrode holder attached to the lower extremity of said jacket. In one embodiment the axis of the electrode and electrode holder is eccentric and parallel with respect to that of the shaft and jacket. In this embodiment, the rotational arc welding tool is particularly useful in performing circular external welds of a tube to a tube header. In another embodiment the axis of the electrode is normal with respect to that of the electrode holder, shaft and jacket. In this latter embodiment the rotatable arc welding tool is particularly useful for performing circular internal welds of tubes to tube sheets. The electrode, holder, shaft and jacket of either embodiment may be interchangeably inserted into the welding tool so that the same basic device may be used to perform either internal or external welds.

The invention will be more fully understood from the following detailed description when considered in connection with the accompanying drawing in which:

FIGURE 3 is an exploded (and partially sectioned) view of the internal components of a welding tool utilizing an electrode adapted for external welding.

FIGURE 4 is an external view of an electrode adapted for internal welding.

FIGURE 5 is a section of an electrode adapted for internal welding wherein coolant is required.

FIGURE 6 is a section of an electrode adapted for internal welding where ambient cooling is sufficient.

Figures 1, 2:
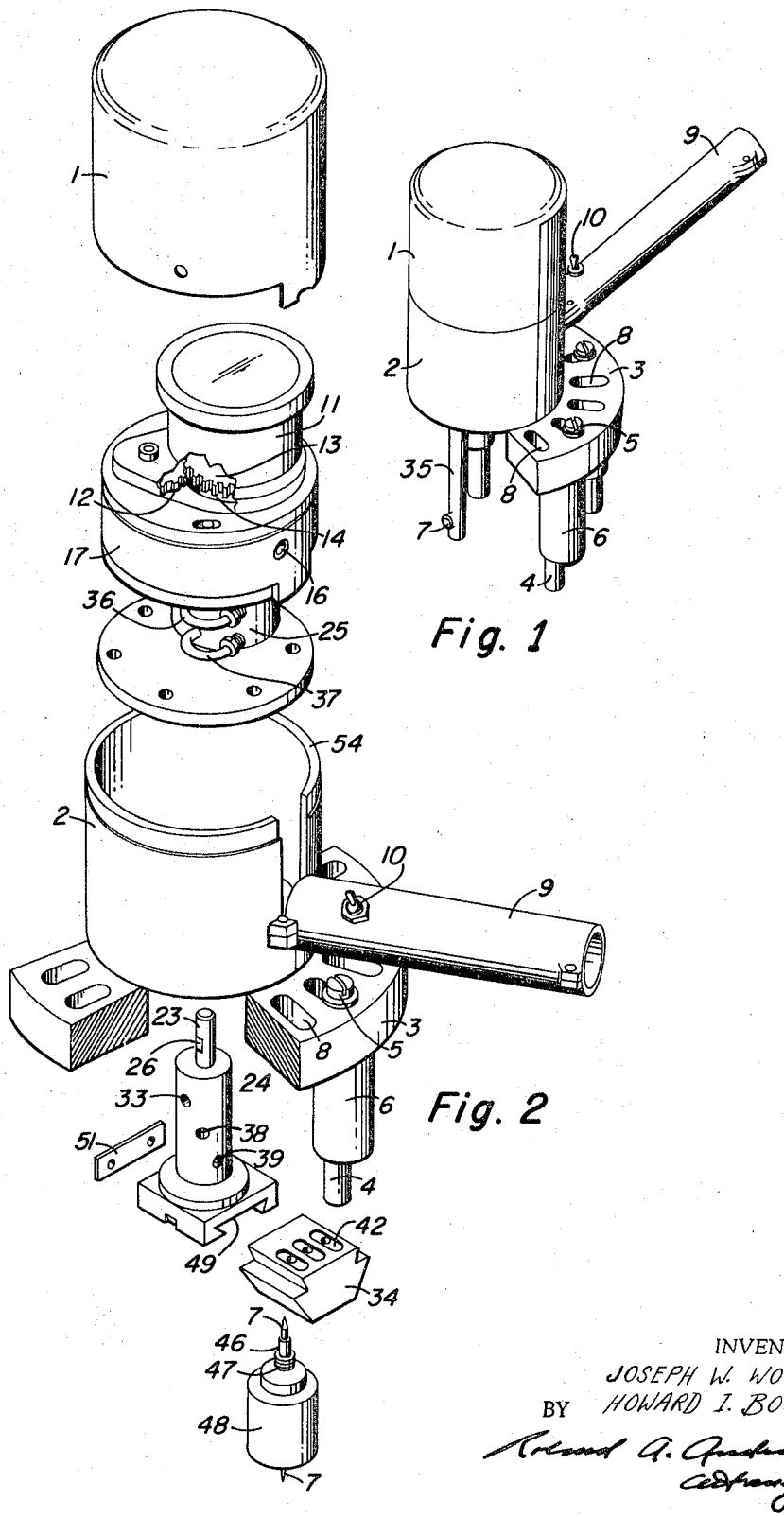
FIGURE 1 is a perspective view of an assembled welding tool utilizing the electrode adapted for internal welding.
FIGURE 2 is an exploded view of a portion of a partially assembled welding tool.

Referring now to FIG. 1, motor cover 1 and body cover 2 are both supported on a base guide block insulator 3 (of, e.g., phenolic nylon). Metal guide pins 4 are separated from fastening bolts 5 by guide pin insulators 6. A plurality of metal guide pins 4 are positioned in tubes on a heat exchanger header so that electrode 7 is correctly positioned at the tube to be welded. It will be noted that guide pins 4 are given a wide range of movement by the large number of elongated slots 8 and the eccentricity of the pins with respect to bolts 5. Handle 9 provides a convenient conduit for inert gas, electrical lines, and, if necessary, coolant. Switch 10 permits current to flow to motor 11 (see FIGS. 2 and 3). Motor 11 (e.g., 2 r.p.m.) drives a drive gear 12 which, in turn, drives a driven gear 13. Driven gear 13 is composed of an insulating material (e.g., phenolic nylon). Gear mount 14 is rigidly fixed to driven gear 13. A screw hole 15 (shown on FIG. 3) extends radially through gear mount 14. Screw hole 16 in phenolic nylon motor mount 17 is in alignment with the screw hole 15 in gear mount 14. Motor 11 is mounted to motor mount plate 18 by screws 19 and both are in turn fastened to motor mount 17 by screws 20. Screws 22 are utilized to fasten driven gear 13 to gear mount 14. Electrode shaft 23 and electrode jacket 24 are inserted through housing 25 and gear mount 14 so that the flattened portion 26 on electrode shaft 23 is in alignment with the screw hole 15 of gear mount 14 and screw hole 16 of motor mount 17. A set screw 21 inserted through screw holes 15 and 16 will, then, force electrode shaft 23 and jacket 24 to rotate with gear mount 14. Since gear mount 14 is rigidly fixed to driven gear 13, motor 11 drives the electrode shaft 23 through the agency of driving gear 12. Housing 25 is isolated from movement of gear mount 14 by ball bearing mount 27. Three tubes 28, 36 and 37 are mounted on housing 25. As stated previously, handle 9 provides a conduit for cooling, inert gas and electrical conduits. One of tubes 28 is utilized to transport inert gas to the interior of housing 25. Tube 36 transports water in for electrode cooling. Tube 37 transports cooling water out, cooling the current conductor. Accordingly, gas travels through arm 9 into tube 28 (and coolant, if needed, through tube 36) through ducts 29 to the interior of housing 25. The said gas (and possibly coolant) is retained in grooves 30 within the housing 25. O-rings 31 are placed in grooves 32 and prevent mixing of gas and coolant because electrode jacket 24 is inserted through housing 25. Ducts 33, 38 and 39 are provided in electrode jacket 24 and the electrode holder (the electrode holder for external welding being represented at 34 and that for internal welding at 35). Gas and coolant being present in grooves 30 can pass freely through ducts in the electrode to the electrode area. For example, as gas is introduced to the interior of housing 25 through tube 28, it will flow through duct 33 to the electrode area. If the water intake is considered as tube 36 then water will pass through duct 38 (see FIG. 5, e.g.) down to the electrode area and back through duct 39 and tube 37. In utilizing the internal electrode a proper gas atmosphere may be obtained by inserting a gas diffuser 40 around electrode 7 and inside orifice 41. Longitudinal holes through this gas diffuser will maintain a smooth flow of inert gas over the weld. Instead of holes the gas diffuser may be constructed of extremely porous material.

If an external electrode is utilized (see FIG. 3) inert gas travels through duct 33 to groove 42 and through duct 45 (which extends through electrode holder 34 so that the gas flows between electrode 7 which is inserted in the electrode holder and collet 46). Collet body 47 screws into holder 34 to maintain collet 46 in place. A ceramic cup also screws onto collet body 47 to maintain the inert gas atmosphere around the weld. Electrode holder 34 is movable along head 49 so that the proper weld diameter may be attained. Set screw 50 inserted in head 49 can engage holder 34 and lock it in place. Plate 51 fastened to head 49 provides a stop for holder 34. Grooves 42, 43 and 44 are elongated since holder 34 may be axially displaced and still permit inert gas and coolant to reach holder 34. Holder 34 as shown in FIG. 3 is adapted for water cooling through grooves 43 and 44 (and ducts 52 and 53), one of said grooves being utilized for inlet water and the other for outlet return water. If ambient air cooling is felt to be sufficient, holder 34 may be provided with only one set of groove 42 and duct 45.

External electrode holder 34 radial adjustment is obtained by sliding holder 34 along head 49. The proper axial adjustment of the electrode 7 may be obtained by variation of the length of legs 6 (FIG. 2) and/or electrode 7 (FIG. 3). When utilizing the internal electrode holder 35 radial adjustment is obtained by the variation in length of the electrode 7 (FIG. 6) and axial variation by length of guide pin insulators 6 (FIG. 2). In either internal or external welding, if a gross variation in axial distances is required, the electrode, holder and jacket may be shortened or lengthened as desired.

In the operation of the welding tool the size of gears 12 and 13 are selected in order to give the proper speed of rotation of electrode 7. An automatic slope control which varies the welding current, then, yields a circular weld of uniform quality.

As stated before, the current to the electrode may be supplied by attachment to tube 37 so that internal components, housing 25, shaft 23, jacket 24 and holder 34 or 35 are "hot." These internal hot components are isolated by insulating sleeve 54 inserted between body cover 2 and the said internal "hot" components. The hot components are further insulated by guide pin insulators 6 (FIG. 2), base guide block insulator 3, driven gear 13 and motor mount 17.

It will be understood from a consideration of the foregoing specific example that the invention is not limited thereto. Various changes can be made in the arrangement of parts without departing from the spirit and scope of the invention, as the same will now be understood by those skilled in the art. For example, the gearing arrangement of the above embodiment may be eliminated by utilizing a variable speed motor. Accordingly, we wish to be restricted only by the following appended claims.

What is claimed is:

1. A rotatable arc welding tool comprising jig means and electrode mounting means, said jig means including an insulating plate and a plurality of adjustable legs for supporting an electrode in proper position for a welding operation, said plate containing a number of oval-shaped ducts, said adjustable legs being attached to said plate by bolts inserted through said ducts, said jig means supporting the electrode mounting means, said electrode mounting means comprising a motor driving a first gear, said first gear driving a second gear, said second gear being composed of insulating material, a gear mount subjacent to and rigidly attached to said second gear, said gear mount being of cylindrical configuration, an electrode shaft being inserted in said gear mount and rigidly connected thereto by screw means inserted radially through said gear mount and contacting said electrode shaft at a flattened portion thereon, said electrode shaft being of greater diameter below said gear mount, a duct through said enlarged portion of said electrode shaft, a cylindrical housing surrounding said enlarged portion, the ducts of the enlarged portion being in alignment with grooves around the internal circumference of said housing and tubing external and attached to said housing being in flow connection with said grooves by ducts through the housing and electrode means attached subjacent to said enlarged portion, said electrode means having a duct therein in flow connection with the said grooves and ducts.

2. A device as claimed in claim 1 wherein the electrode means comprises a holder means capable of axial displacement with respect to said enlarged portion, an elongated groove in said holder in alignment with a duct through said enlarged portion, electrode means inserted into the bottom portion of said holder means and a cup around the electrode of said electrode means.

3. A device as claimed in claim 1 wherein said electrode means comprises a narrowed portion extending subjacent from said enlarged portion and coaxial therewith and an electrode placed normal with respect to the axis of the electrode shaft, said electrode being surrounded by disc means, said disc means being capable of supporting a smooth flow of gas therethrough.

References Cited by the Examiner

UNITED STATES PATENTS

| | | | |
|---|---|---|---|
| 2,818,493 | 12/1957 | Pilia et al. | 219—125 |
| 3,064,120 | 11/1962 | Ache | 219—125 |
| 3,084,243 | 4/1963 | Gotch | 219—125 X |
| 3,125,670 | 3/1964 | Hawthorne | 219—125 |
| 3,134,894 | 5/1964 | Farnsworth | 219—125 |
| 3,142,745 | 7/1964 | Gotch | 219—125 |
| 3,159,734 | 12/1964 | Cooksey et al. | 219—125 |

JOSEPH V. TRUHE, *Primary Examiner.*